United States Patent [19]

Brachert

[11] Patent Number: 5,506,770
[45] Date of Patent: Apr. 9, 1996

[54] DIRECTIONAL STABILITY CONTROLLER

[75] Inventor: Jost Brachert, Ditzingen, Germany

[73] Assignee: Robert Bosch GmbH, Stuttgart, Germany

[21] Appl. No.: 260,004

[22] Filed: Jun. 15, 1994

[30] Foreign Application Priority Data

Jun. 21, 1993 [DE] Germany ............. 43 20 478.3

[51] Int. Cl.$^6$ .............. B60K 31/00; G06G 7/70
[52] U.S. Cl. .............. 364/424.01; 364/426.04; 180/117; 307/10.1; 327/232
[58] Field of Search ........... 364/424.01, 431.03, 364/431.07, 424.1, 426.01, 426.02, 426.03, 426.04; 361/238, 242, 244; 180/197, 117; 307/10.1; 327/231, 232, 233

[56] References Cited

U.S. PATENT DOCUMENTS

| | | | |
|---|---|---|---|
| 3,610,957 | 10/1971 | Hiscox | 327/232 |
| 4,235,210 | 11/1990 | Sumiyoshi et al. | 123/471 |
| 4,794,539 | 12/1988 | Wallentowitz et al. | 364/426.01 |
| 4,831,985 | 2/1989 | Mabee et al. | 123/399 |
| 5,029,090 | 3/1991 | Kuhn et al. | 364/426.04 |
| 5,172,319 | 12/1992 | Shiraishi et al. | 364/426.03 |
| 5,183,128 | 2/1993 | Ito et al. | 180/197 |
| 5,235,512 | 8/1993 | Winkelman et al. | 364/426.04 |
| 5,269,391 | 12/1993 | Ito et al. | 180/197 |
| 5,275,474 | 1/1994 | Chin et al. | 364/426.02 |
| 5,315,516 | 5/1994 | Miller et al. | 364/424.01 |
| 5,315,519 | 5/1994 | Chin et al. | 364/426.02 |
| 5,316,379 | 5/1994 | Becker et al. | 364/426.02 |
| 5,365,439 | 11/1994 | Momose et al. | 364/424.05 |

OTHER PUBLICATIONS

IEEE Standard Dictionary of Electrical and Electronics Terms, p. 31.
Fettweis, "Digital Filter Structures Related to Classical Filter Networks" AEU Band 25 (1971) pp. 79–89.
Tietze and Schenk, Halbleiter–Schaltungstechnik, Springer Verlag (1974) pp. 352–358.

Primary Examiner—Kevin J. Teska
Assistant Examiner—Tyrone V. Walker
Attorney, Agent, or Firm—Felfe & Lynch

[57] ABSTRACT

A desired value for the yaw velocity or the difference between the wheel speeds of the undriven wheels is determined with the aid of a linear single-track model using the steering angle and the vehicle speed. This desired value is compared with the corresponding actual value and the controlled variable for the adjustment to the engine torque is obtained from the comparison. To avoid unnecessary control operations, the single-track model has connected to its output an all-pass element which matches the phase rotation of the response of the single-track model at high frequencies to that of the vehicle.

2 Claims, 2 Drawing Sheets 5,506,770

DIRECTIONAL STABILITY CONTROLLER

BACKGROUND OF THE INVENTION

The invention relates to a directional stability controller for a motor vehicle. U.S. Pat. Nos. 5,029,090 and 4,794,539 describe controllers of the type which use a single-track model to determine a desired value of the yaw velocity or a desired value of the difference in speeds of the steered wheels from the steering angle and the vehicle speed. The deviation between the desired value and the actual value is then used to control engine torque.

In the case of vehicle controllers of this kind, which are intended to control the transverse dynamics of the vehicle, the actual vehicle movement must be compared with the intended movement. For this purpose, the driver's intention is determined by measuring the steering angle. The intended vehicle movement (yaw velocity) is then determined by means of a linear single-track model using the measured vehicle speed. The linear single-track model comprises two differential equations:

$$\dot{\beta} = \frac{c_v}{m_g v}\delta_r - \frac{c_h}{m_g v}\delta_h + \left(\frac{c_h l_h - c_v l_v}{m_g v^2} - 1\right)\dot{\psi}_s - \frac{c_v + c_h}{m_g v} \cdot \beta$$

$$\ddot{\psi}_s = \frac{c_v l_v}{\theta_z}\delta_r - \frac{c_h l_h}{\theta_z}\delta_h - \frac{c_v l_v^2 + c_h l_h^2}{\theta_z v}\dot{\psi}_s + \frac{c_h l_h + c_v l_v}{\theta_z}\beta$$

in which:

$\psi_s$=intended yaw velocity
$\beta$=attitude speed
v=vehicle speed
$\delta_h$=wheel steer angle, rear
$\delta_r$=wheel steer angle, front
$\delta$=steering-wheel angle
$\theta_z$=moment of inertia about the vertical axis
$l_v$=centroidal distance, front
$l_h$=centroidal distance, rear
$m_g$=total mass
$c_v$=slip stiffness, front
$c_h$=slip stiffness, rear
$s=j\omega$ This gives the (yaw) transfer function:

$$\frac{\dot{\psi}}{\delta_r} = \frac{s(c_v l_v - c_h l_h f_h) + (c_h l_h - c_v l_v)\frac{(c_v + c_h f_h)}{m_g \cdot v} + \frac{(c_v + c_h)(c_v l_v - c_h l_h f_h)}{m_g \cdot v}}{s^2\theta_z + s\frac{c_v l_v^2 + c_h l_h^2 + (c_v + c_h)\theta_z/m_g}{v} + \frac{c_v c_h (l_v + l_h)^2}{m_g \cdot v^2} + c_h l_h - c_v l_v}$$

where $\delta_h = f_h \cdot \delta_r$, and $f_h$ is the relationship between the front-axle wheel steer angle $\delta_r$ and the rear-axle steer angle $\delta_h$. Without rear-axle steering, $\delta_h = 0$.

As an alternative to the yaw velocity $\psi_s$, it is also possible to use the difference between the speeds of the wheels of the undriven axle, the actual value being measured and the desired value being determined by means of the single-track model.

For high frequencies (in the vicinity of the characteristic frequency), the frequency response of the yaw transfer function of the linear single-track model has a phase shift of $-\pi/2$. Actual vehicles have a phase shift of about $-\pi$ in this range (due to additional elasticities in the running gear and to the tire recovery length).

Since the phase shift of the linear single-track model differs from that of the actual vehicle, dynamic maneuvers (rapid lane changes, turn-off procedures) lead to a phase error in the calculation of the desired value. The desired value arrives at a figure before the actual vehicle value has time to reach it. As a result, a deviation between the desired and the actual movement is erroneously observed and an unwarranted control operation (e.g. reduction in engine power) is initiated.

In order to compensate for this difference, the desired values of the last 200 ms have, in an internal development, hitherto been stored in a ring buffer store. To determine the system deviation, the ring buffer store was searched for the desired value which differed the least from the actual value. This difference was then used as the system deviation. Under certain circumstances, this procedure made the system deviation too small and, as a result, the phase compensation in these cases inevitably hindered. This led to jumps in the characteristic of the system deviation.

SUMMARY OF THE INVENTION

The invention eliminates the RAM-intensive ring buffer store and the program for controlling this ring buffer store. The program for implementing the all-pass facility is comparatively smaller. The jumps in the signal for the system deviation due to the prohibition of phase compensation are eliminated.

The first order all-pass element connected to the output of the linear single-track model for phase compensation changes the phase of the transfer function without affecting the amplitude:
The transfer function is as follows $$H = \frac{c - j\omega}{c + j\omega}$$

From this there follows, for example, the discrete realization:

out=a1*in+a2*(out+in1)
in1=in
where a1=-(1-dt*c)/(1+dt*c)
a2=1/(1+dt*c)
in=actual input signal
in1=input signal of the previous cycle
out=output signal
c=characteristic frequency

DETAILED DESCRIPTION OF THE PREFERRED EMBODIMENT

Figure 2A:
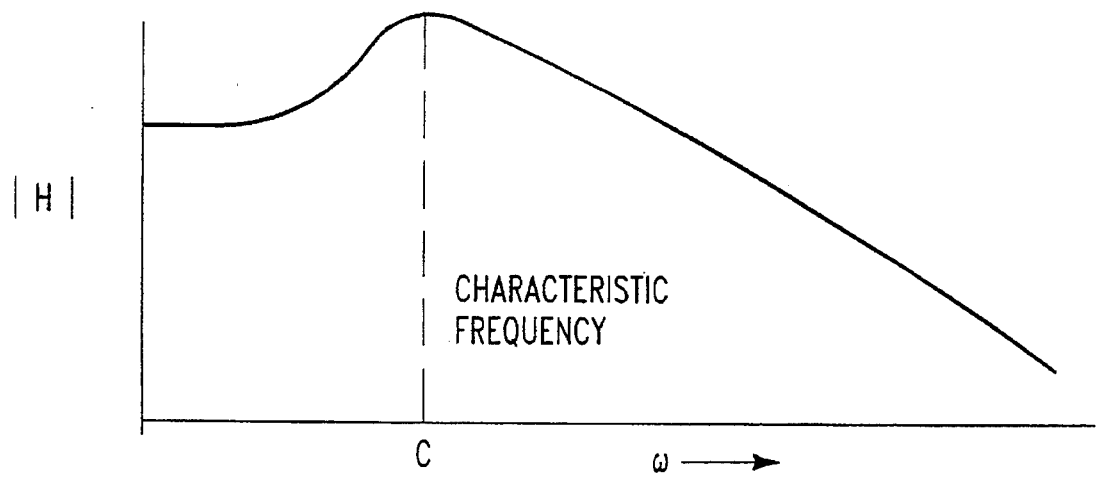
FIG. 2A is a plot of the amplitude of the transfer function.
Figure 2B:
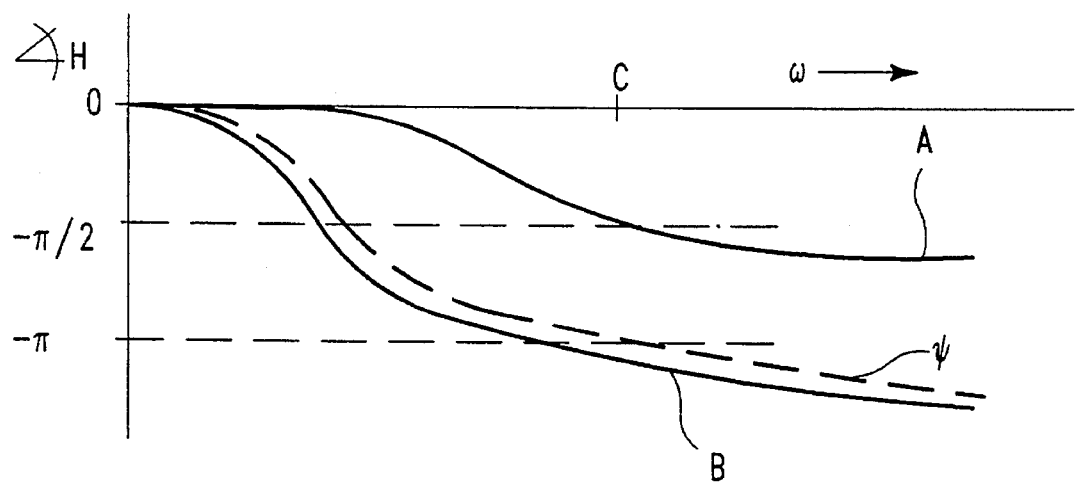
FIG. 2B is a plot of the phase shifted desired transfer function and the actual phase angle response of the vehicle.

Wheel speed sensors 1 and 2 assigned to the non-driven front wheels provide wheel speed values $v_R$ and $v_L$. The vehicle speed $v_F$ (reference speed) is formed from these signals in a known way (e.g. averaging) in a block 3. A front steering angle sensor 4 provides a steering angle signal $\delta_r$. The variables $v_F$ and $\delta_r$ are fed to a desired-value generator 5 which, by means of the linear single-track model, determines from the variables supplied the desired difference $D_s$ between the front-wheel speeds as the desired value. Connected to the output of the desired-value generator 5 is an all-pass element 6. At frequency $\omega(=2\pi f)$, the single-track model of the desired-value generator 5 has the amplitude $|H|$ shown in FIG. 2A; the characteristic frequency c is where $|H|$ is a maximum, generally about 1 Hz. The phase angle H of the single-track model has the response denoted by curve A in FIG. 2B. The phase angle response of the vehicle is shown by curve B. The first-order all-pass element on the output side changes the phase response A of the single-track model into the response in accordance with curve $\phi$. The dimensioning of the all-pass element is determined by the characteristic frequency c. When $\omega=c$, the phase shifting is $-\pi/2$. At $\omega=0$ the phase shifting is 0. As $\omega \to \infty$, phase shifting $\to -\pi$.

In a difference former 8, the actual difference $D_i$ between the wheel speed values is formed, and this is compared in a comparator 7 with the desired value $D_s$ coming from the all-pass element 6. The resulting difference is the system deviation, which is fed to a controller with an actuator 9 for the adjustment of a throttle valve 10.

Figure 1:
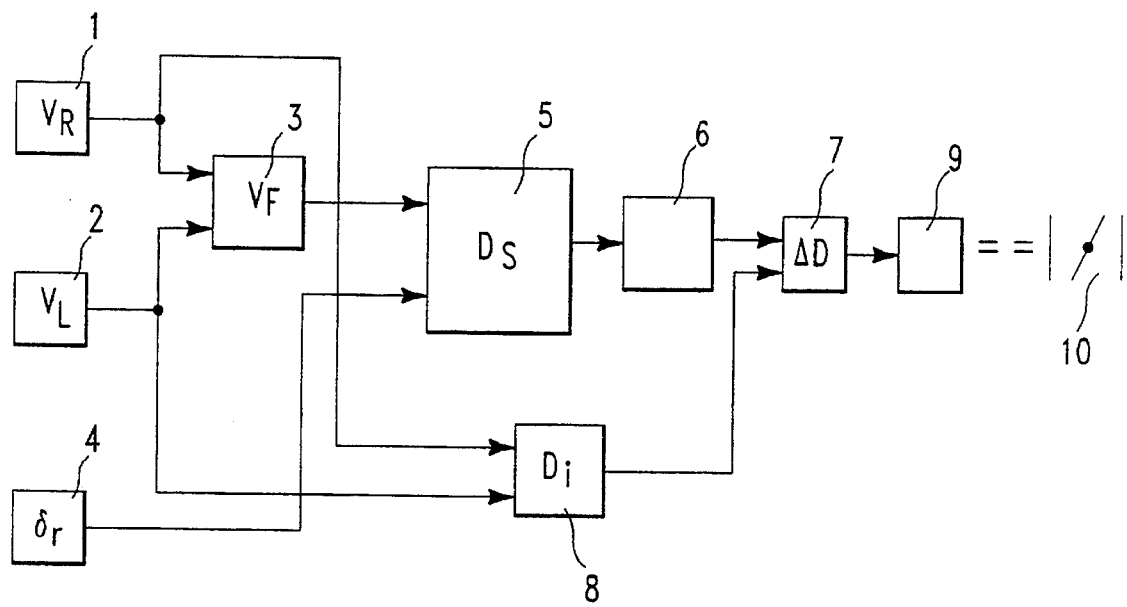
FIG. 1 is a block diagram of the controller using difference in speeds of steered wheels.
Figure 1A:
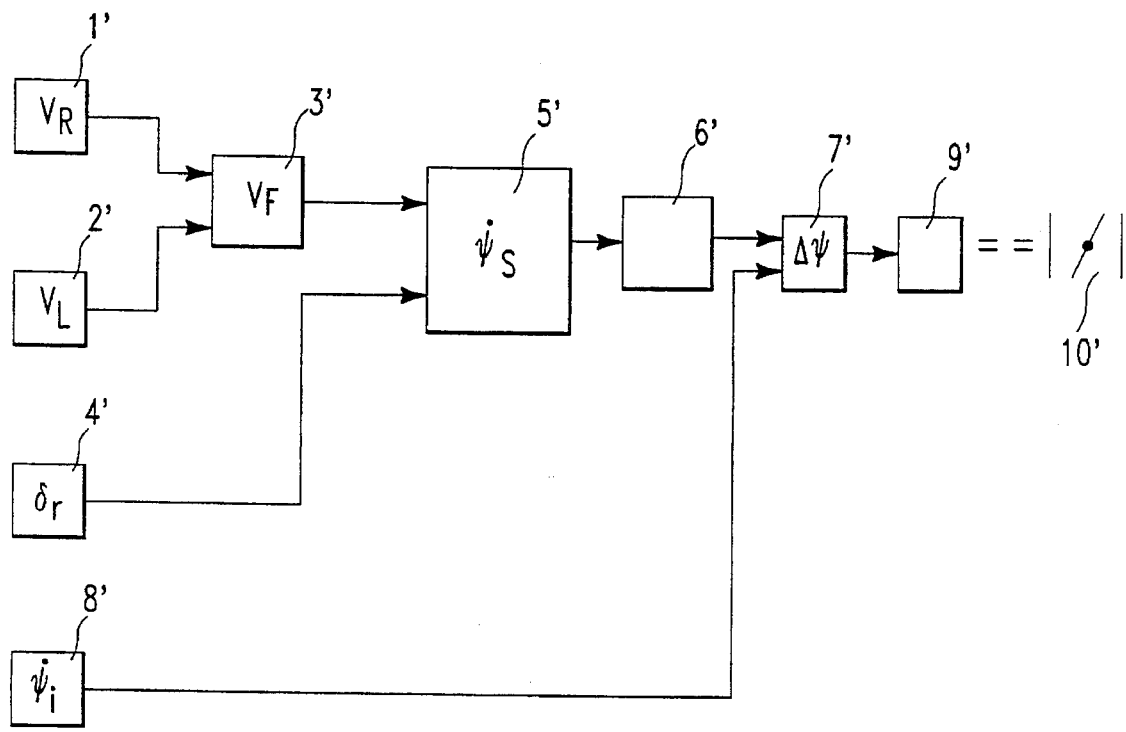
FIG. 1A is a block diagram of the controller using yaw velocity.

According to FIG. 1A, the difference between the actual value $\psi_i$ and desired value $\psi_s$ for the yaw velocity is formed, the difference former 8 being replaced by a yaw-velocity sensor 8'. The actual value $\psi_i$ from sensor 8' is compared with the desired value $\psi_s$ from the desired-value specifier 5' and the all-pass element 6'.

Note in FIG. 1 that $D_s$ is calculated from $\psi_s$ by $D_s=S \psi_s$, where S is the wheel base of the vehicle. $\psi_s$ is calculated from $v_F$ and $\delta_r$.

I claim:

1. Directional stability controller for a motor vehicle having an engine which produces torque and a pair of steered wheels, said controller comprising means for determining the wheel speeds of the steered wheels, means for determining the actual difference between the wheel speeds of the steered wheels, means for determining the vehicle speed, means for determining the steering angle of the steered wheels, means for generating a desired difference between the wheel speeds of the steered wheels from the steering angle and the vehicle speed using a single track model, an all-pass element which shifts the phase of the desired difference to produce a phase-shifted desired difference, means for determining the deviation between the phase-shifted desired difference and the actual difference, and means for varying the engine torque in response to the deviation.

2. Directional stability controller for motor vehicle having an engine which produces torque and a pair of steered wheels, said controller comprising means for determining the actual yaw velocity of the vehicle, means for determining the vehicle speed, means for determining the steering angle, means for generating a desired yaw velocity from the vehicle speed and the steering angle using a single track model, an all-pass element which shifts the phase of the desired yaw velocity to produce a phase-shifted desired yaw velocity, means for determining the deviation between the phase-shifted desired yaw velocity and the actual yaw velocity, and means for varying the engine torque in response to the deviation.

* * * * *